No. 804,737. PATENTED NOV. 14, 1905.
E. KRENZ.
PROCESS OF GENERATING GAS.
APPLICATION FILED JULY 23, 1904.
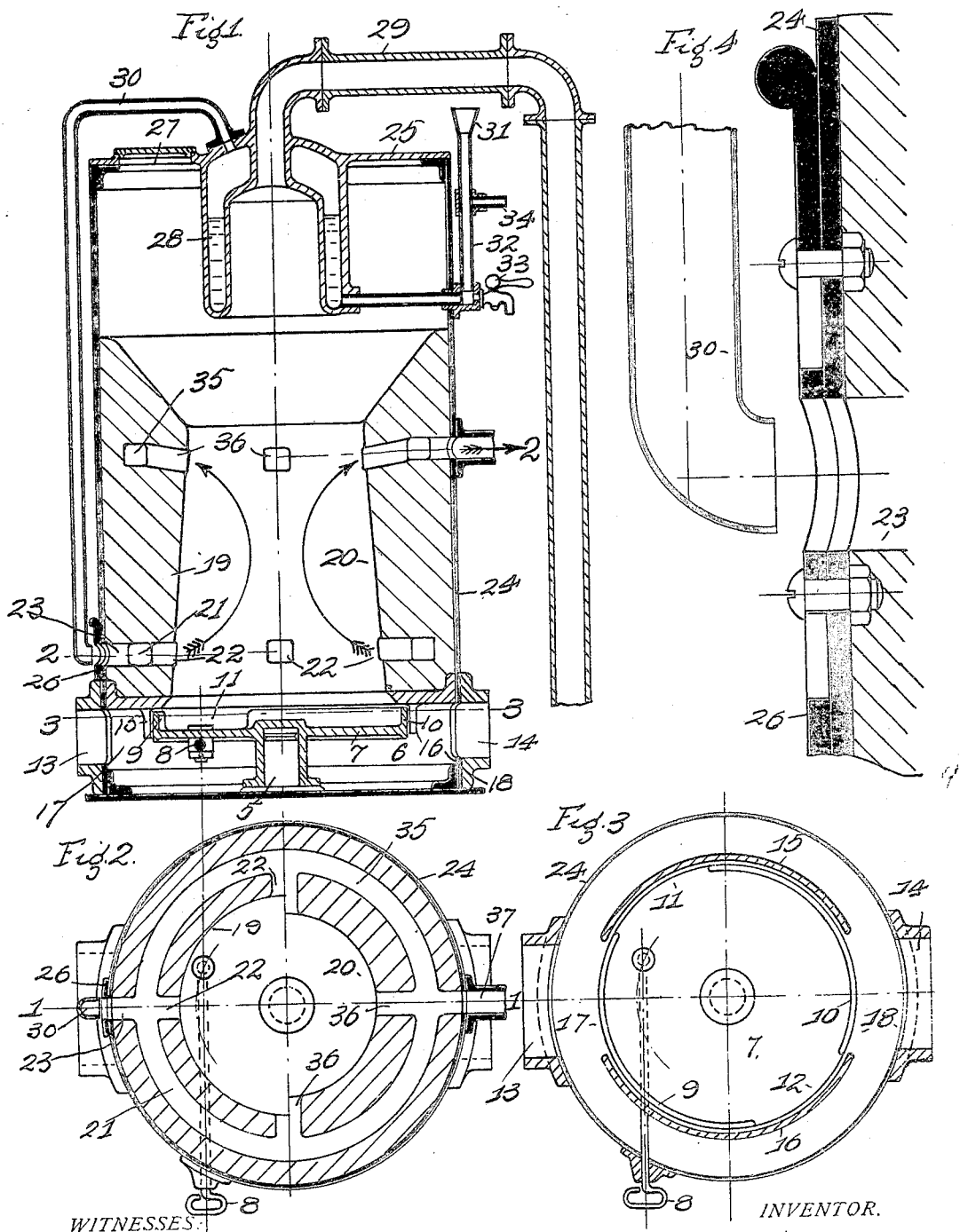
WITNESSES: INVENTOR.
Edward Krenz
BY
Higdon, Longan & Hopkins
ATTORNEYS

UNITED STATES PATENT OFFICE.

EDWARD KRENZ, OF ST. LOUIS, MISSOURI.

PROCESS OF GENERATING GAS.

No. 804,737. Specification of Letters Patent. Patented Nov. 14, 1905.

Application filed July 23, 1904. Serial No. 217,772.

*To all whom it may concern:*

Be it known that I, EDWARD KRENZ, a citizen of the United States, and a resident of St. Louis, Missouri, have invented certain new and useful Improvements in Processes of Generating Gas, of which the following is a specification containing a full, clear, and exact description, reference being had to the accompanying drawings, forming a part hereof.

My invention relates to improvements in the process of generating gas; and it consists of the novel features herein shown, described, and claimed.

In the drawings, Figure 1 is a vertical central section on the line 1 1 of Fig. 2. Fig. 2 is a horizontal section on the line 2 2 of Fig. 1. Fig. 3 is a horizontal section on the line 3 3 of Fig. 1. Fig. 4 is a sectional detail on the same line as Fig. 1, upon an enlarged scale, showing the regulation of the air-inlet, the other parts being broken away to economize space.

Referring to the drawings in detail, the pedestal 5 is mounted vertically at the center of the ash-pit 6, and the imperforate fire-pot bottom 7 is mounted upon the pedestal. A handle 8 is attached to the bottom of the fire-pot bottom and extends outwardly through the wall to be used in shaking the fire-pot bottom. Flanges 9 and 10 extend upwardly from the fire-pot bottom, there being openings 11 and 12 between the ends of the flanges, said openings being in transverse alinement, and there being openings 13 and 14 leading into the ash-pit, so that when the handle 8 is pulled outwardly the openings 11, 12, 13, and 14 are all in alinement. Flanges 15 and 16 extend downwardly from the body of the fire-pot outside of the flanges 9 and 10, there being openings 17 and 18 between the ends of the flanges 15 and 16 in alinement with the openings 13 and 14, so that when the handle 8 is shoved inwardly the flanges 15 and 16 close the openings 11 and 12 and prevent the fire and ashes from falling from the fire-pot into the ash-pit.

The body 19 of the fire-pot is constructed of fire-brick, the fire-pot chamber 20 being circular in plan and directly above the bottom 7. An air-distributing chamber 21 is formed in the fire-brick near the bottom and extends entirely around the fire-pot, there being openings 22 leading from the chamber into the fire-pot and there being an opening 23 leading from the open air into the chamber. A metal casing 24 surrounds the fire-brick and extends upwardly a considerable distance above the fire-brick, and a top 25 closes the upper end of this casing. The air-inlet opening 23 extends through the casing 24, and a slide 26 controls the passage of air through the inlet-opening. An opening 27 in the top 25 provides means for inserting fuel into the fire-pot, said opening being controlled by a suitable removable cover. A steam-boiler 28 depends from the top 25 directly above the fire-pot, and a smoke-flue 29 leads from the fire-pot upwardly through the steam-boiler to the smoke-stack. A steam-pipe 30 leads from the steam-boiler 28 outwardly and downwardly and blows into the air-inlet 23. A funnel 31 is mounted in position above the level of the steam-boiler, and a pipe 32 connects said funnel to the bottom of the steam-boiler. A faucet 33 is attached in the lower part of the pipe 32 to provide means for drawing the water out of the steam-boiler, and an overflow-pipe 34 is attached in the vertical part of the pipe 32 at a point to limit the rise of the water in the steam-boiler, so as to prevent filling the latter too full and so as to prevent the overflow from passing through the pipe 30. A gas-collecting chamber 35 is formed in the upper part of the fire-pot 19, there being passages 36 leading from the upper part of the fire-pot to said chamber and there being an outlet 37 leading from the chamber outwardly through the wall.

The generators hereto produced have been constructed principally for the use of anthracite coal, and these generators could not be used with soft coal, lignite, and other inferior fuel. It is the principal object of my improved process to provide means of using an inferior grade of fuel.

In the fire-pot, which is filled with soft or bituminous coal, the fire is ignited, and the fuel contained in the pot is reduced to a red-hot mass of coke. The necessary air to bring about the reduction of this coal is regulated by a slide 26 and parts 7 and 9. In starting the fire the amount of draft may be regulated by operating the handle 8 to open the openings 11 and 12, and the cinders and ashes may be removed by inserting a draw-rod through the openings 13 and 14 and through the openings 11 and 12. As the fire progresses a layer of ashes and cinders will accumulate upon the fire-pot bottom and produce an insulation, which will prevent the heat from being radiated downwardly into the ash-pit. After the fuel contained in the fire-pot is changed to a red-hot mass of coke new fuel is added through opening 27 above the fire-pot and below the plate 25. The smoke, coal-tar, and other impurities that are set loose in the process of changing the coal into coke are simultaneously expelled into pipe 29. The gas is generated above the ashes and clinkers that are formed in the fire-pot and below the fresh fuel, which feeds itself to the fire-pot. I am thus able to use soft or bituminous coal as against anthracite commonly used in making suction-gas for the use of gas-engines, &c. The water in the steam-boiler 28 will become heated, and the steam will pass through the steam-pipe 30 and blow into the air-inlet 23, thus causing a mixture of air and steam to pass into the chamber 21 and from the chamber be distributed through the openings 22 into the lower part of the fire-pot, and this mixture of air and steam will pass through the red-hot mass and pass upwardly into the gas-collecting chamber 35, as indicated by the arrows in Fig. 1, and by any suitable means this gas will be sucked through the outlet 37 and disposed of as desired. The mixture of steam and air will be forced into the chamber 21 by the resistance of the fuel within the fire-pot. The top of the red-hot mass of fuel will be above the gas-chamber 35, so that the gas sucked into and out of the gas-chamber will be pure and so that the foul gases and smoke will pass upwardly through the flue 29 and not contaminate the gas which is to be used. The force of the suction of the gas through the outlet 37 must be properly regulated relative to the force of the draft through the pipe 29 so as to separate the smoke from the gas. If either force is too strong, both the pure and impure gas will be carried in the direction of the stronger force.

If it is desired to produce gas for the operation of a gas-engine, the engine will be connected directly to the outlet-pipe 37, and as the engine operates it will secure its charges directly from the red-hot mass in the fire-pot.

I do not herein claim any portion of the apparatus, as same has been made the subject-matter of a divisional application filed by me on December 10, 1904, Serial No. 236,333.

I claim—

The improved process of generating gas from bituminous coal, which consists in igniting a body of such bituminous fuel within a fire-pot and reducing it to a red-hot mass; piling fresh fuel on the red-hot mass within a fresh-fuel chamber at the top of said fire-pot and simultaneously withdrawing the inherent smoke from the said fresh-fuel chamber at a point above the flame and openings through which the said gas makes its exit; injecting steam and air into the bottom of the red-hot mass above the grate, and simultaneously sucking the gas at a point below the top plane of the red-hot mass and at a point below the new fuel which is contained within said fresh-fuel chamber and below the plane of the smoke-exit opening, substantially as specified.

In testimony whereof I have signed my name to this specification in presence of two subscribing witnesses.

EDWARD KRENZ.

Witnesses:
ALFRED A. EICKS,
F. C. CRISLER.